(12) United States Patent
Pemberton et al.

(10) Patent No.: US 12,715,309 B2
(45) Date of Patent: Aug. 25, 2026

(54) BOGIE FOR A LIGHT RAIL SYSTEM

(71) Applicant: The Council of the City of Coventry, Coventry (GB)

(72) Inventors: Martin Pemberton, Stratford-upon-Avon (GB); Paul Salkeld, Stratford-upon-Avon (GB); Matthew Hall, Stratford-upon-Avon (GB); Jorgen Gustafsson, Stratford-upon-Avon (GB); Adrian Howson, Stratford-upon-Avon (GB); Antoni Sozanski, Stratford-upon-Avon (GB)

(73) Assignee: THE COUNCIL OF THE CITY OF COVENTRY COUNCIL HOUSE, Coventry (GB)

( * ) Notice: Subject to any disclaimer, the term of this patent is extended or adjusted under 35 U.S.C. 154(b) by 477 days.

(21) Appl. No.: 18/263,461

(22) PCT Filed: Feb. 2, 2022

(86) PCT No.: PCT/GB2022/050272
§ 371 (c)(1),
(2) Date: Jul. 28, 2023

(87) PCT Pub. No.: WO2022/167791
PCT Pub. Date: Aug. 11, 2022

(65) Prior Publication Data

US 2025/0001878 A1 Jan. 2, 2025

(30) Foreign Application Priority Data

Feb. 2, 2021 (GB) ..................................... 2101415
Feb. 2, 2021 (GB) ..................................... 2101416

(51) Int. Cl.
*B60L 50/51* (2019.01)
*B61C 9/50* (2006.01)
*B61C 17/06* (2006.01)

(52) U.S. Cl.
CPC ................ *B60L 50/51* (2019.02); *B61C 9/50* (2013.01); *B60L 2200/26* (2013.01); *B60L 2210/44* (2013.01); *B61C 17/06* (2013.01)

(58) Field of Classification Search
CPC ........ B60L 50/51; B60L 2200/26; B61C 9/50; B61C 3/02; B61F 5/50

(Continued)

(56) References Cited

U.S. PATENT DOCUMENTS

2011/0083578 A1* 4/2011 Sami ........................ E01B 31/17 246/167 R
2016/0207421 A1 7/2016 Nogi
2016/0251023 A1* 9/2016 Nishimura ................ B61F 5/52 105/198.6

FOREIGN PATENT DOCUMENTS

DE 102019109971 A1 10/2020
JP 2008154401 A 7/2008

(Continued)

OTHER PUBLICATIONS

PCT/GB2022/050272, International Search Report and Written Opinion, Mailed on May 9, 2022, 10 pages.

*Primary Examiner* — Troy Chambers
(74) *Attorney, Agent, or Firm* — Kilpatrick Townsend & Stockton LLP

(57) ABSTRACT

A bogie for a rail-based vehicle, such as a train or tram. The bogie comprises one or more rail wheel arrangements, each having two rail wheels. The rail wheels are driven by a motor arrangement, comprising one or more electrical motors. The operation of the motor arrangement is controlled by alternating signals provided by an inverter (Continued)

arrangement formed in the bogie. The inverter arrangements converts a direct current (power supply) to one or more alternating currents, or one or more alternating current power supplies, for controlling the torque applied by the electrical motor(s) of the motor arrangement.

13 Claims, 4 Drawing Sheets

(58) Field of Classification Search
USPC .......................................................... 105/34.1
See application file for complete search history.

(56) References Cited

FOREIGN PATENT DOCUMENTS

| | | | |
|---|---|---|---|
| JP | 2018039316 | A | 3/2018 |
| WO | 2008134860 | A1 | 11/2008 |
| WO | 2015086667 | A1 | 6/2015 |
| WO | 2018215147 | A1 | 10/2020 |

* cited by examiner

BOGIE FOR A LIGHT RAIL SYSTEM

CROSS-REFERENCE TO RELATED APPLICATIONS

This application is a 35 U.S.C. § 371 National Stage Entry of International Application No. PCT/GB2022/050272, filed on Feb. 2, 2022, which claims priority to GB 210415.4, filed Feb. 2, 2021, and GB 210416.2, filed Feb. 2, 2021, which are incorporated herein by reference in their entirety for all purposes.

FIELD OF THE INVENTION

The present invention relates to the field of rail-based vehicles, and in particular, to bogies for use with rail-based vehicles.

BACKGROUND OF THE INVENTION

There is a long tradition of rail-based vehicles, such as a tram or train, which propel themselves along rail-based infrastructure, e.g. along one or more tracks coupled to a ground surface.

There has been a growing adoption of electric rail-based vehicles. Historically, electric rail-based vehicles draw power from an external (to the vehicle) power line that runs above, beside or underneath (e.g. as an electric ground rail) the tracks along which the vehicle travels. Electrical motors are then used to drive wheels of the rail-based vehicle. These wheels may be mounted, for example, upon a bogie fastened to an underside of a carriage for the rail-based vehicle.

There has been an increasing interest in the use of electric rail-based vehicles that contain batteries for powering electrical motors. These rail-based vehicles are sometimes called a battery electric railcar or battery electric multiple unit. The use of batteries avoids the need for external power lines.

There is an ongoing desire to improve the operation of rail-based vehicles, and in particular, rail-based vehicles that make use of batteries.

SUMMARY OF THE INVENTION

The invention is defined by the claims.

According to examples in accordance with an aspect of the invention, there is provided a bogie for a rail-based vehicle. The bogie comprises: one or more rail wheel arrangements, each rail wheel arrangement comprising a first rail wheel; and a second, different rail wheel; a motor arrangement comprising one or more electrical motors configured to drive the rail wheels of each rail wheel arrangement; and an inverter arrangement.

The inverter arrangement is configured to: receive a direct current from a battery arrangement; convert the direct current into one or more alternating currents; and provide the one or more alternating currents to the one or more electrical motors of the motor arrangement to power the one or more electrical motors.

The present disclosure relates to a concept for positioning one or inverters (of an inverter arrangement), for an electric rail-based vehicle, upon the bogie(s) for the rail-based vehicle.

Positioning the inverter arrangement on the bogie itself helps reduce electromagnetic compatibility issues with the bogie, e.g. by reducing possible electromagnetic interference. In particular, it is recognized that an alternating current (AC) for a motor can cause large amounts of electromagnetic interference, EMI, due to the inherent undesirable impedances in a cable carrying such an alternating current. By positioning the inverter(s) on the bogie itself, the length of the cable carrying such an alternating current is reduced/minimized, thereby reducing the amount of shielding required and/or an amount of EMI.

Positioning an inverter arrangement on the bogie also facilitates independent testing and configuration of the bogies propulsion capabilities. In particular, the inverter arrangement can be configured independently of the rail vehicle, e.g. to tune the inverter arrangement for the specific bogie (and the specific requirements of the motor arrangements of the bogie). This facilitates a "plug-and-play" functionality for the bogie, reducing a configuration or tailoring that needs to be performed once the bogie is connected to the rail-based vehicle.

This approach thereby facilitates increased ease of installing a bogie and/or maintaining the electrical components of a bogie, i.e. providing a more modular rail-based vehicle. This desire for a more modular rail-based vehicle has been previously unnoticed or unrecognized in the rail industry, but facilitates reduced downtime and ease of maintenance.

In the context of the present application, the terms "direct current" and "alternating current" are considered interchangeable with the terms "direct current supply" and "alternating current supply" respectively, or with the terms "direct voltage" and "alternating voltage" respectively, or with the terms "direct voltage supply" and "alternating voltage supply" respectively.

An alternative label for a bogie is a "truck", and the two terms are considered interchangeable.

In some examples, the inverter arrangement comprises, for each electrical motor of the motor arrangement, a respective inverter configured to receive the direct current from the battery arrangement and convert the direct current into an alternating current for the electrical motor.

A separate inverter for each motor facilitates improved control over the propulsion provided by the bogie. In particular, the separate converter can provide different levels of power for each motor, to facilitate distributed driving of the bogie (and a rail-based vehicle that makes use of such a bogie).

In some examples, the motor arrangement comprises, for each rail wheel set, a respective electrical motor configured to drive the rail wheels of the rail wheel set. Use of different electric motors for each rail wheel set facilitates the use of distributed torque techniques for the bogie. In other words, this approach facilitates improved control over the torque applied to each wheel arrangement, e.g. to allow different amounts of torque to be applied at different points around a corner or up/down an incline, thus improving an efficiency of the rail-based vehicle.

Preferably, the one or more wheel arrangements comprises two or more rail wheel arrangements.

In at least one embodiment, the bogie further comprises a cooling system configured to cool the motor arrangement and the inverter arrangement. The cooling system may comprise any suitable coolant, e.g. air or water, for cooling the motor arrangement and the inverter arrangement. The cooling system may be enclosed in or confined to the bogie alone (i.e. may be mounted on and cool components of only a single bogie). The cooling system may draw power from the inverter arrangement, e.g. there may be a separate inverter for the cooling system. Thus, the inverter arrangement may comprise a cooling system inverter configured to receive the direct current from the battery arrangement and convert the direct current into an alternating current for the cooling system, the cooling system inverter being configured for use with the cooling system alone.

Positioning the cooling system on the bogie alone further increases a modularity (as well as an ease of maintenance and bogie-replacement) of the overall rail-based vehicle, as it avoids the need for a coolant line to be connected to the bogie. This increases an ease of disconnecting a bogie from the rest of the rail-based vehicle.

The inverter arrangement may further comprise an inverter controller, configured to control the properties of the one or more alternating currents provided to the one or more electrical motors of the motor arrangement. The inverter controller may be responsive, for instance, to a user input provided at a control panel or user interface of the rail-based vehicle. The inverter controller may therefore be adapted to receive, at an input interface, an input signal, and control the one or more alternating currents provided to the one or more electrical motors responsive to the input signal (effectively controlling a propulsive force provided by the bogie).

The input signal may, for instance, define a desired torque to be applied by the one or more electrical motors to the respective rail wheel arrangements, and may be provided from a vehicle control system (e.g. via a Control Area Network (CAN) bus). This input signal may be responsive to a user input provided at a user interface or control panel (e.g. to achieve a desired speed or the like).

The inverter controller may also be responsive to diagnostic information, current and voltage measurements (i.e. feedback), temperature sensing inputs and the like. Approaches for controlling the operation of an inverter and motor arrangement based on such information will be readily apparent to the skilled person.

Preferably, the inverter arrangement is configured to receive the direct current from a battery arrangement positioned externally to the bogie.

The inverter arrangement may be positioned towards the center of the bogie. In other words, the inverter arrangement may be positioned closer to the center of the bogie than to an outer edge of the bogie.

Preferably, all inverters of the inverter arrangement are positioned adjacent to one another, e.g. side by side.

There is also proposed a rail-based vehicle comprising two or more bogies as herein described. The rail-based vehicle may further comprise a battery arrangement configured to provide a direct current to the inverter arrangement of each bogie. Preferably, the battery arrangement is separate to the two or more bogies.

In some examples, the rail-based vehicle is devoid of a system for drawing power from an external power source during travel of the rail-based vehicle. In other words, the rail-based vehicle may not comprise a trolley pole, a bow collector, a pantograph (or other system for drawing power from overhead lines) and/or fail to comprise a pickup for drawing power from a third rail. In this way, the rail-based vehicle may be configured so that the battery arrangement is only chargeable from an external power source when the rail-based vehicle is stationary or near-stationary.

The rail-based vehicle may have a weight no greater than 20,000 kg, e.g. no greater than 17,000 kg, e.g. no greater than 12,000 kg (e.g. if excluding passenger weights). Thus, the weight (of the vehicle) may range from 10,000 kg to 20,000 kg, from 10,000 kg to 17,000 kg, from 10,000 kg to 12,000 kg.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
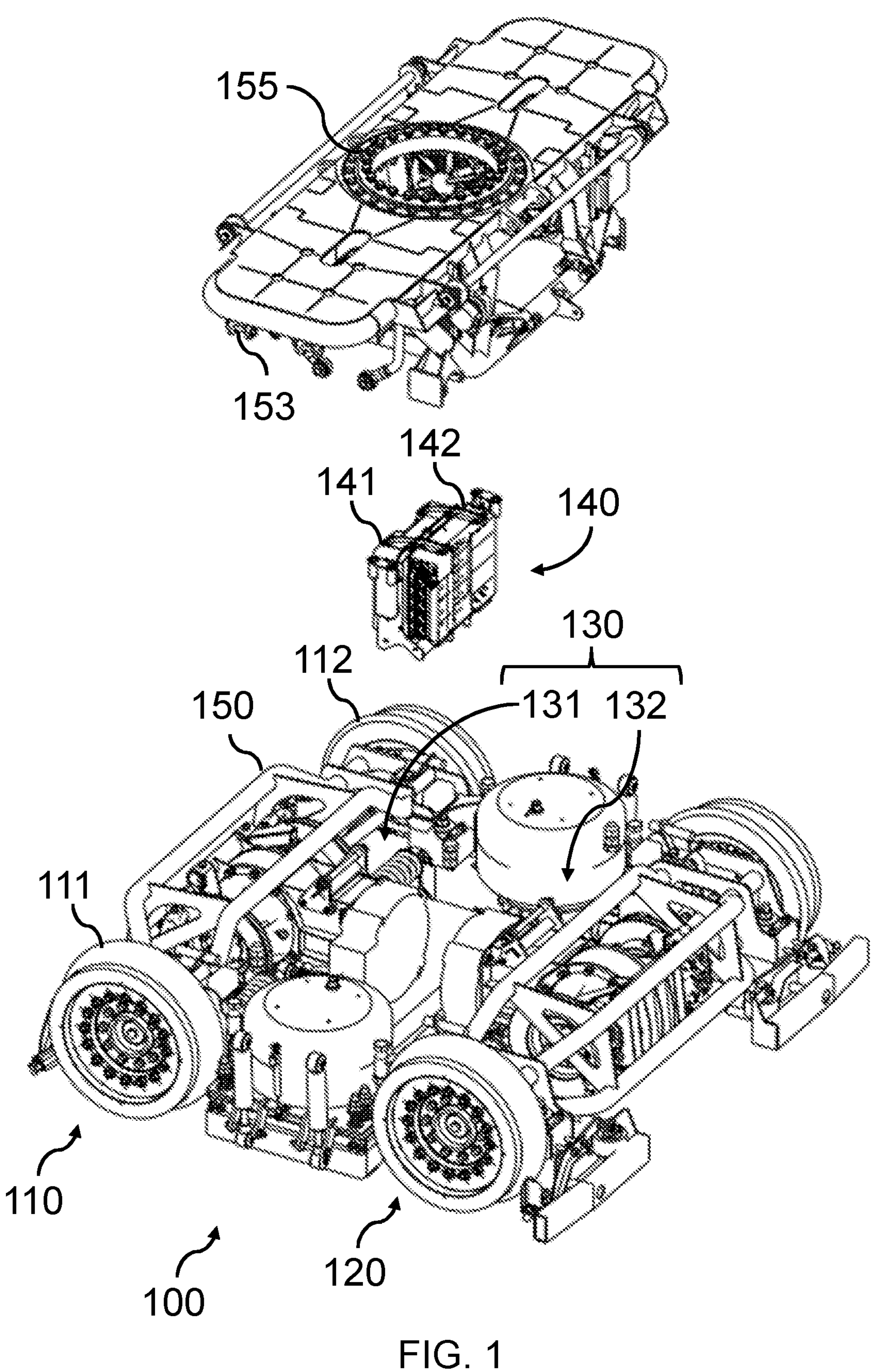
FIGS. 1 and 2 illustrate a bogie according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a bogie for a rail-based vehicle, such as a train or tram. The bogie comprises one or more rail wheel arrangements, each having two rail wheels. The rail wheels are driven by a motor arrangement, comprising one or more electrical motors. The operation of the motor arrangement is controlled by alternating signals provided by an inverter arrangement formed in the bogie. The inverter arrangement converts a direct current (power supply) to one or more alternating currents, or one or more alternating current power supplies, for controlling the torque applied by the electrical motor(s) of the motor arrangement.

The inventors have recognized an advantage to positioning an inverter (arrangement) for the electrical motor(s) of a bogie upon the bogie itself. This reduces the length of cables carrying alternating current(s) for the electrical motor(s), e.g. to reduce an amount of material required and/or to reduce electromagnetic interference provided by such cables carrying alternating signals. This approach also facilitates testing and tuning of the inverter for the specific motor arrangement of the bogie independently of the rail-based vehicle (e.g. only needing the bogie, without needing the rest of the rail-based vehicle), to facilitate improved ease in maintaining and replacing bogies.

Effectively, the present invention recognizes a benefit in placing the inverters for electric-based vehicles upon the bogies of the vehicles, rather than externally to the bogies (e.g. together with the battery arrangement that stores power for driving the motor arrangement(s)).

Figure 2:
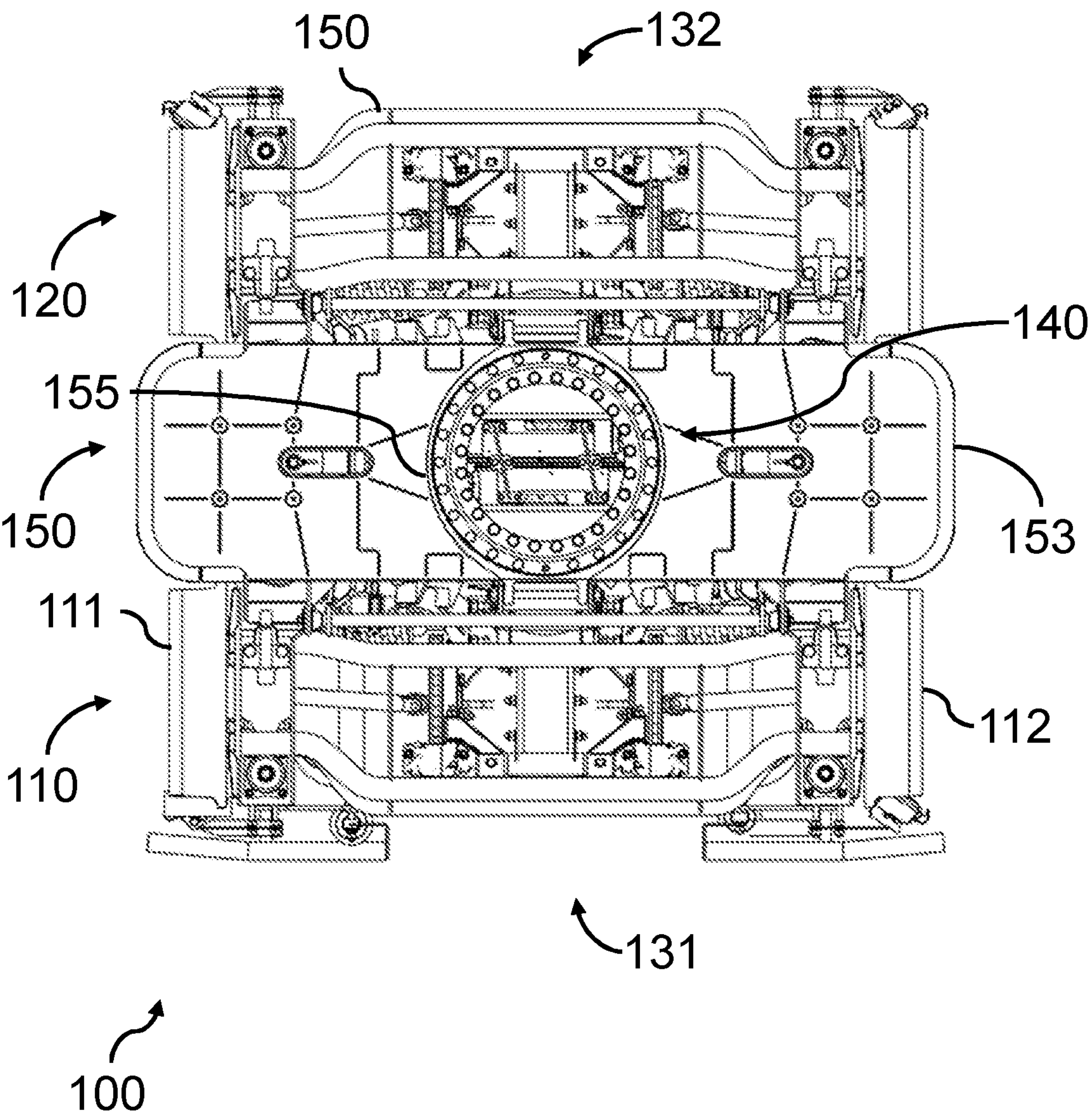

FIGS. 1 and 2 illustrate a bogie 100 according to an embodiment of the invention. The bogie is designed for a rail-based vehicle, e.g. a carriage, train or tram. The rail-based vehicle may comprise a plurality of such bogies, as would be readily apparent to the skilled person.

FIG. 1 provides an exploded view of the bogie 100, and FIG. 2 provides a top-down view of the bogie 100.

The bogie 100 may be configured to carry and/or support a carriage for the rail-based vehicle thereon.

The bogie 100 comprises a first rail wheel arrangement 110 and a second rail wheel arrangement 120. The skilled person would appreciate that the bogie may be adapted to comprise only a single rail wheel arrangement or more than two rail wheel arrangements.

The first 110 and second 120 rail wheel arrangements are near-identical, differing primarily in their positions on the bogie. For the sake of conciseness, only a single one of these rail wheel arrangements will be hereafter described, although the other rail wheel arrangement may comprise similar/corresponding elements.

The first rail wheel arrangement 110 comprises a first rail wheel 111 and a second rail wheel 112. A rail wheel is a wheel that is configured/designed for use on a railway track. The rail wheels 111, 112 are connected via a rail wheel axle. The rail wheel axle may, as illustrated, be a split wheel axle which effectively forms a first rail wheel axle and a second rail wheel axle, which are connected together by a differential, such as an open differential, as described in more detail below. However, in other examples, the rail wheels 111, 112 may be connected by a single, unified rail wheel axle (i.e. so that the rail wheels 111, 112 are controlled so as to rotate at a same speed).

The bogie 100 also comprises a motor arrangement 130. The motor arrangement comprises one or more electrical motors configured to drive the rail wheels of each rail wheel arrangement. In the illustrated example, the motor arrangement 130 comprises an electrical motor for each wheel arrangement, i.e. a first electrical motor 131 and a second electrical motor 132.

The electrical motor(s) are configured to control the rotation of the rail wheels, i.e. drive the rail wheels. The electrical motor(s) may control the rotation of the rail wheels using any suitable control mechanism, e.g. via one or more gearboxes and/or differentials. Suitable mechanisms for facilitating control of rail wheel rotations using electric motors will be readily apparent to the skilled person.

The bogie 100 also comprises an inverter arrangement 140. The inverter arrangement 140 is configured to provide one or more alternating currents to the motor arrangement 130. In particular examples, the inverter arrangement is configured to provide a different alternating current (or set of alternating currents—e.g. three alternating currents for providing a three-phase power supply) to each electrical motor 131, 132 of the motor arrangement 130.

In particularly preferable examples, the inverter arrangement 140 comprises a separate inverter 141, 142 for each electrical motor of the motor arrangement. For instance, a first inverter 141 may be configured to control the operation of the first electrical motor 131, and a second inverter 142 may be configured to control the operation of the second electrical motor 132.

The properties of the alternating current(s) define the torque supplied by each electrical motor of the motor arrangement for driving the rail wheels. In particular, a magnitude of the current and/or voltage of the alternating current(s) supplied by the inverter arrangement to the motor arrangement controls or otherwise defines the torque provided or supplied by the electrical motor(s).

In particular, the inverter arrangement is configured to receive a direct current (supply) from a battery arrangement, which may be positioned separately or externally to the bogie itself (i.e. "off-board"). For instance, the battery arrangement may be mounted upon other parts of a rail-based vehicle comprising the bogie—e.g. the carriage of the rail-based vehicle.

This effectively means that a bogie can be simply coupled to a carriage (i.e. the remainder of the rail-based vehicle) and connected with a power supply (provided by a battery) and control wires/cables in order to correctly operate (e.g. rather than needing to connect to a potential complex inverter output). This facilitates increased ease in installing, removing and/or maintaining a bogie, as it can be readily separated from the rest of the rail-based vehicle. Put another way, the proposed bogie facilitates an improved, more modular rail-based vehicle (i.e. in which parts or components can be readily replaced).

The inventive concept is particularly advantageous when the inverter arrangement provides a set of (at least three) alternating currents to each electrical motor, i.e. when the electrical motor(s) is configured to operate using at least three alternating currents as input (i.e. three-phase design). In particular, a direct current supply is usually carried over two cores/cables (one to provide a high voltage, and one to provide a ground/reference voltage). If the inverter arrangement is configured to provide a set of at least three alternating currents (to each electrical motor), then the amount of cable/core required to provide the electrical motor is reduced when the inverter is located in the bogie, compared to if the inverter arrangement is external to the bogie, as the inverter arrangement will be more proximate to the electrical motor(s), thereby requiring a reduced amount of cabling. This is because at least one less cable/core will be provided from outside of the bogie to within the confines of the bogie.

The inverter arrangement 140 may comprise one or more inverter controllers, configured to control the properties of the one or more alternating currents provided to the one or more electrical motors of the motor arrangement. In some examples, each inverter (of the inverter arrangement) comprises a separate inverter controller.

In particular, and as previously explained, it will be appreciated that the properties of the one or more alternating currents provided to the electrical motor(s) of the motor arrangement 130 define an operation of the electrical motor(s), e.g. define a torque applied by the electrical motor(s) and thereby a propulsive force and/or rotation speed of the rail wheels 111, 112. In particular, the magnitude of a current and/or voltage supplied by the inverter arrangements to the electrical motor(s) defines the torque provided by the electrical motor(s). Typically, the greater the power of the alternating current(s) supplied to the motor arrangement, the greater the torque applied by the motor arrangement.

The inverter controller(s) thereby controls the (magnitude of the) propulsive force provided by the bogie 100, and thereby the speed of the overall rail-based vehicle comprising the bogie.

The inverter controller may be responsive to one or more input signals, e.g. received at an input interface of the inverter controller.

At least one input signal may be provided by an external vehicle control system, e.g. which controls or defines a desired operation for the motor arrangement—e.g. defining a torque to be provided by each motor to the rail wheels. The input signal may, for example, be responsive to a user input received at a user interface of the rail-based vehicle, to allow a user to control the operation/speed of the rail-based vehicles. The input signal may be received by the inverter controller via a Control Area Network (CAN) bus, using approaches well known to the skilled person.

The one or more input signals may further comprise signals carrying additional information, such as diagnostic information, current and voltage measurements (e.g. feedback information), temperature information and the like.

This additional information aids in the accurate provision of a desired torque by the electrical motor(s), as would be readily apparent to the skilled person.

Mechanisms and schemes for controlling the speed of a rail-based vehicle by controlling the operation of inverters for electrical motor(s) of bogies are well known and established in the prior art.

The bogie may comprise a cooling system (not visible) configured to cool the motor arrangement and the inverter arrangement. The cooling system may, for example, be a water-cooling system, which may require a radiator with a fan and/or a water pump. However, other suitable coolants (e.g. gaseous coolants such as air) could be used.

Preferably, all the components located in the bogie are cooled using the same cooling system. In some examples, the cooling system may be enclosed in or confined to the (single) bogie—i.e. may be unconnected from other components of a rail-based vehicle comprising the bogie. It is recognized that confining a cooling system to a bogie facilities increased ease in connecting and disconnecting a bogie (e.g. for maintenance or repair), e.g. as there will be no need to disconnect a coolant supply from the bogie. This facilitates a further improved "plug and play" functionality of the bogie.

It is recognized that positioning the inverters on the bogie itself (e.g. rather than externally to the bogie) means that the cooling system required for a powertrain of a single bogie can be confined to the bogie itself, reducing an amount of cooling system elements needed to be positioned off-board from the bogie.

The inverter arrangement may comprise a cooling system inverter configured to receive the direct current from the battery arrangement and convert the direct current into an alternating current for use for (powering) the cooling system, the cooling system inverter being configured for use with the cooling system alone.

Figure 3:
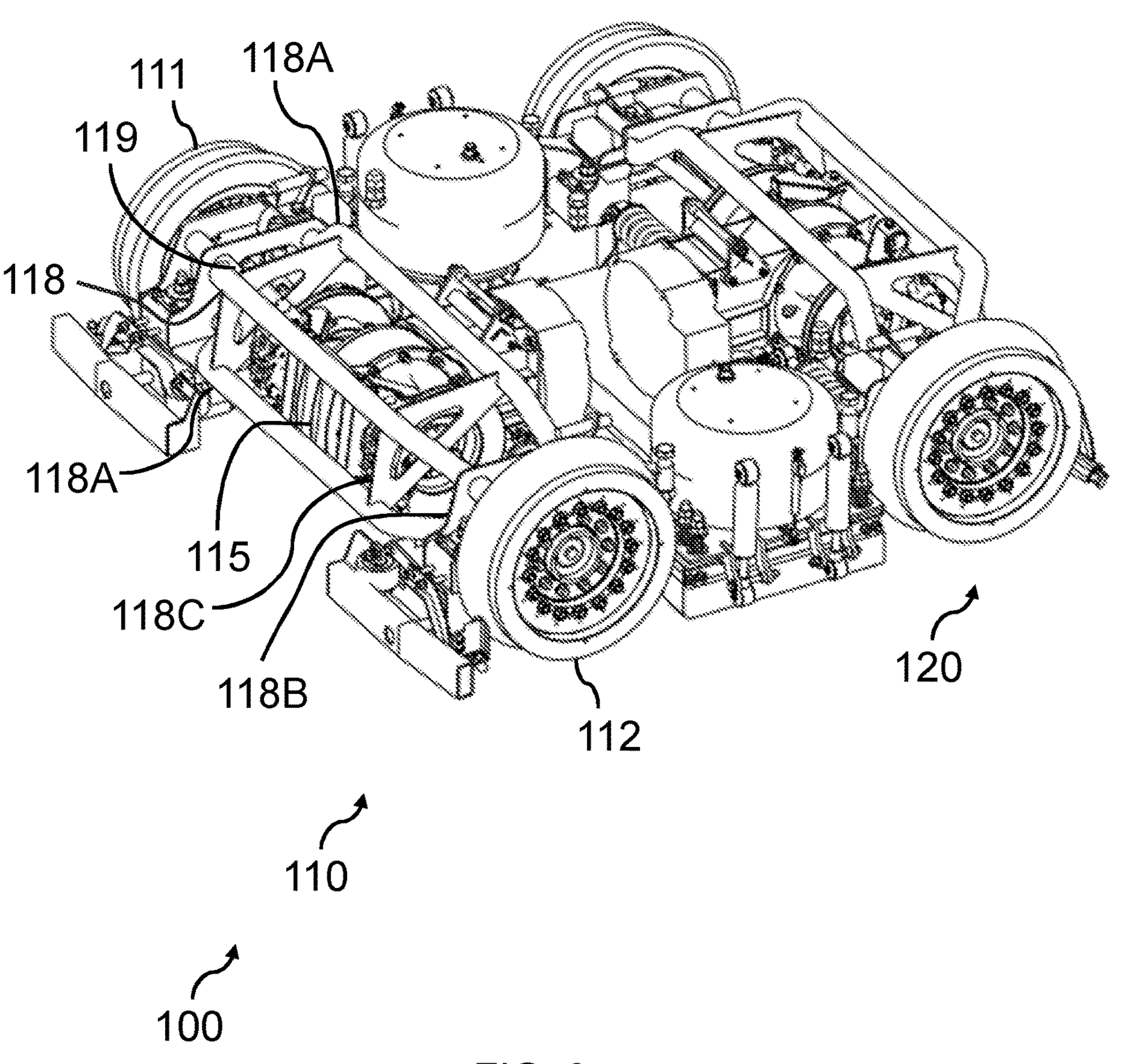
FIGS. 3 and 4 illustrate a bogie according to an embodiment.

As stated above, the first rail wheel 111 and the second rail wheel 112 may be connected/coupled together via an open differential of the first wheel arrangement 110. This embodiment is illustrated more clearly in FIGS. 3 and 4. FIG. 3 provides a perspective view of the bogie 100, and FIG. 4 provides a top-down view of the bogie 100.

Figure 4:
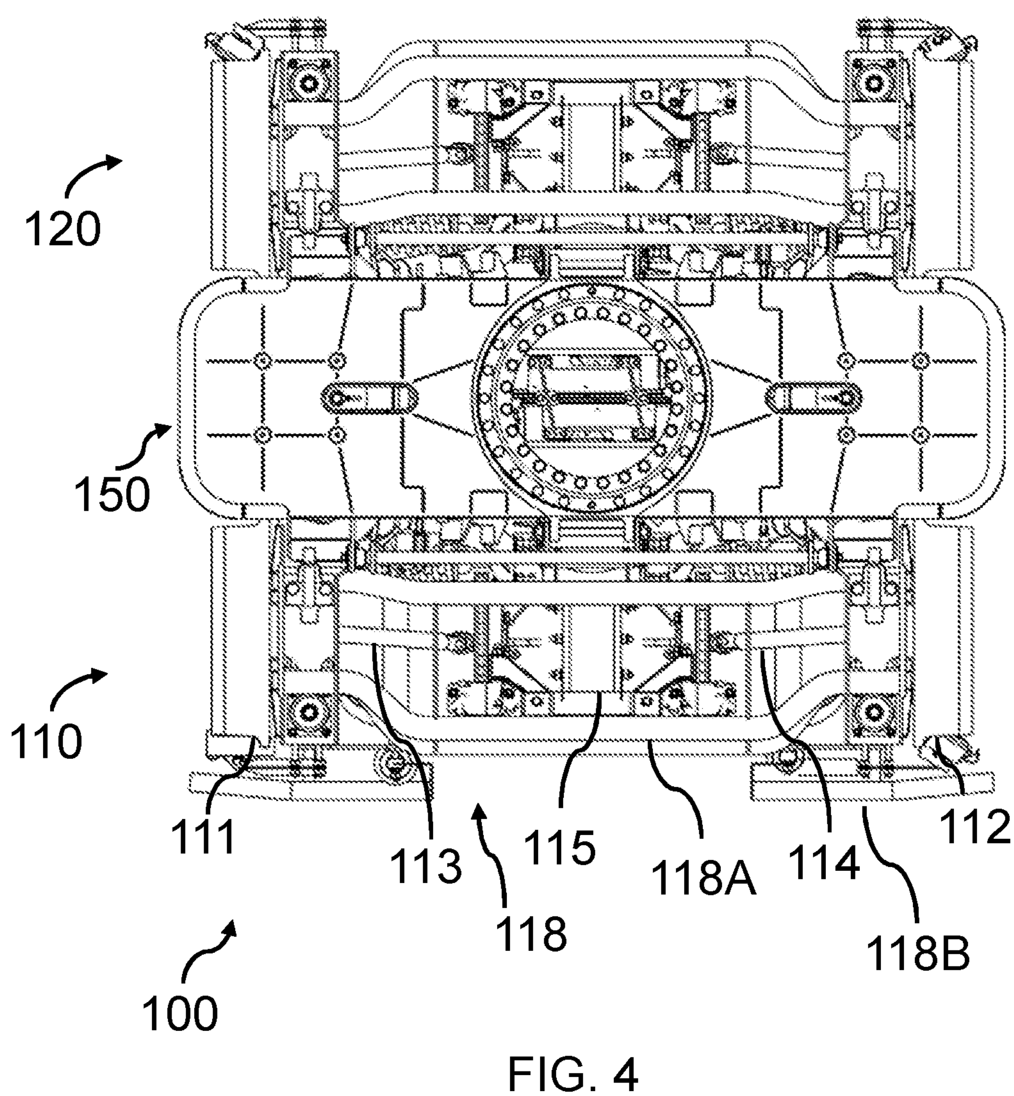

For the sake of improved clarity, some of the features of the bogie 100 illustrated in FIGS. 1 and 2 are omitted from FIGS. 3 and 4. It should be understood that these omissions are for illustrative purposes only.

In FIGS. 3 and 4, the first rail wheel 111 connects to an open differential 115 via a first wheel axle 113, and the second rail wheel 112 connects to the open differential via a second rail wheel axle 114. The skilled person will appreciate how the open differential allows each rail wheel axle to rotate at different speeds, whilst being driven simultaneously by a same transmission axle (not shown) provided to the open differential.

The open differential may function in the same way a conventional open differential operates. An input pinion (e.g. connected to the transmission axle) to the differential turns a ring gear and a cage, upon which a planet gear is mounted. The planet gear is in turn connected so as to rotate two sun gears, each of which is coupled to a respective rail wheel axle. In particular, the planet gear is positioned able to rotate about an axis of the ring gear as well as spin about its own axis. Rotation of the planet gear about the axis of the ring gear induces a same rotation to both sun gears. Rotation of the planet gear about its own axis induces opposite rotations in both sun gears.

Generally, when the bogie 100 is travelling down a straight track, all rail wheels can be assumed to spin at the same speed. Effectively, this means that the planet gear does not rotate about its own axis, so that both wheel axles are rotated at a same speed.

However, as the bogie begins to turn, the wheels wish to turn at different speeds. This causes the planet gear to begin spinning about its axis, allowing the wheels to move at different speeds. This happens automatically (i.e. without being controlled by a computer/user).

The use of an open differential in a bogie for a rail-based vehicle may be particularly advantageous in rail-based vehicles for use in an urban environment. The inventors have recognized that rail-based vehicles for use in such environments would benefit from a capability of travelling around relatively tight corners, e.g. to negotiate a corner having a radius of no more than 25 m, e.g. no more than 15 m. It is also herein recognized that, in such environments, the weight of the rail-based vehicle is usually relatively low, meaning that it is no longer essential for wheels to be connected together by a fixed axle (which, for standard rail-based vehicles, is essential to allow the bogie to provide sufficient structural support for the rail-based-vehicle).

In other words, the inventors have recognized that a problem of how to provide sharp corners for a rail-based vehicle, e.g. for an urban environment, arises at a same time as a weight of the rail-based vehicle reduces (i.e. as lighter rail-based vehicles are used in the same circumstances). This facilitates the use of an open differential in a bogie for the rail-based vehicle. Previously, open differentials were not usable, as fixed-axle structures were considered essential to provide suitable support (i.e. without breaking) for a rail-based vehicle.

There is therefore a particular use case in which a rail-based vehicle having an open differential would be advantageous and possible, e.g. without breakage or having unreliable structural integrity.

The open differential of each rail wheel arrangement preferably does not comprise a limited slip differential or a locking differential. There is an increased risk of derailment if such differentials are used (e.g. if the differential fails to unlock), meaning that an improved safety can be ensured if the open differential does not comprise a limited slip or a locking differential.

Each open differential may be driven by a respective electrical motor of the motor arrangement 130. The electric motor may be mounted to a same framework and/or mount as the open differential. That is, the open differential and the motor may be connected to the remainder of the bogie by a same mount. For instance, the open differential and the motor may be provided in a same housing—i.e. form a single unit. In particular examples, coupling of the motor and the open differential may be via a resilient drive and via a drive/Cardan shaft.

The motor of each rail wheel arrangement may be configured to operate at a rotation speed of up to no more than 8000 rotations per minute (e.g. up to no more than 6000 RPM) and/or configured to provide a torque of up to no more than 150 Nm (e.g. up to no more than 145 Nm).

In preferred examples, the motor may be coupled to the open differential by one or more gearboxes. This allows a motor to operate according to an "optimal" rotation speed, e.g. most efficient rotation, whilst still powering the open differential at a desired rotation. In other words, the use of a gearbox can allow tailoring or customizing of the wheel speed of the rail wheel arrangement to suit the electrical motor selected. The one or more gearboxes may, for instance, be gearboxes designed for an automotive vehicle.

The first rail wheel arrangement 110 may further comprise a first framework 118. The first framework is configured to support the rail wheel axles 113, 114 of the first rail wheel arrangement 110. The first framework 118 acts to improve the structural integrity of the bogie.

In particular, it is recognized that the use of an open differential 115 means a reduction in the overall strength/stiffness of the bogie. In existing bogie designs, the single wheel axle provides strength to the bogie, which is lost if an open differential 115 is used—as the single wheel axle will be effectively split into the first rail wheel axle 113 and the second rail wheel axle 114.

The use of the first framework 118 provides additional structural strength to account for this lost structural integrity, thereby overcoming a problem of lost strength without losing the advantages of an open differential (for improved cornering capabilities). In particular, the first framework can help reduce the impact of lateral forces (e.g. centripetal forces introduced during turning) and/or twisting of the bogie due to uneven weight distribution, movement over uneven surfaces or the like.

The first framework 118 may be connected to the first and second rail wheel axles by respective bearings 119 (of which only one is visible in FIG. 3). This allows the rail wheel axles (and therefore respective rail wheels) to freely rotate, whilst still providing additional support.

The first framework 118 may be formed of one or more lateral beams 118A, which are connected to the first and second rail wheel axles (and therefore the first and second rail wheels) via respective bearings. In particular, the one or more lateral beams may be connected at either end by respective framework plates 118B, which each mount a respective bearing for the first/second rain wheel axle.

In the illustrated embodiment, the first framework 118 comprises four lateral beams 118A, but any number of lateral beams 118A can be used.

If there is more than one lateral beam, then the lateral beams may be further braced together by one or more bracing members 118C. This acts to further increase the structural support provided by the first framework.

The open differential 115 may be an open differential designed for an automotive vehicle (such as a car). These open differentials are usually compact (i.e. reducing a size of the overall bogie) and can be provided "off-the-shelf", thereby reducing the cost and design complexity of the overall bogie, as well as enabling the use of components that have been tested for reliability and dependability.

The use of an open differential designed for an automotive vehicle is particularly advantageous if the first rail wheel arrangement comprises the first framework 118, as it provides additional space and/or flexibility for positioning the one or more lateral beams.

The skilled person would appreciate that the concept of a bogie having an open differential may be employed to supplement the concept of a bogie containing its own inverter arrangement, or in its own right.

Thus, there may be provided a bogie for a rail-based vehicle, the bogie comprising one or more rail wheel arrangements, each rail wheel arrangement comprising: a first rail wheel; a second, different rail wheel and an open differential connecting the first and second rail wheels together, so that the first and second rail wheels are driven simultaneously, but so that the first rail wheel is able to rotate at a different speed to the second rail wheel.

Preferably, the one or more rail wheel arrangements comprises two or more rail wheel arrangements. Of course, the bogie may comprise any number of rail wheel arrangements, but embodiments are particularly preferably when there are a plurality of rail wheel arrangements.

As previously noted, the open differential of each rail wheel arrangement may be an open differential configured for use with a motor or automotive vehicle, such as a car. It is advantageously recognized that, for some rail-based vehicles, an open differential designed for a motor vehicle such as a car can be repurposed for use in the rail-based vehicle. This embodiment thereby makes use of "off-the-shelf" components, reducing a cost of providing a bogie according to an embodiment, as well as being able to make use of components that have been tested for reliability and dependability.

Preferably, a bogie with an open differential is configured to support a rail-based vehicle having a weight no greater than 20,000 kg, e.g. no greater than 17,000 kg, e.g. no greater than 12,000 kg (e.g. if excluding passenger weights). Thus, the weight (of the vehicle) may range from 10,000 kg to 20,000 kg, from 10,000 kg to 17,000 kg, from 10,000 kg to 12,000 kg. In particular, the use of an open differential in the bogie is particularly advantageously used in an urban environment, in which the weight of the rail-based vehicle is generally lower. This embodiment recognizes the particularly advantageous use-case scenario for the open differential, and recognizes that the use of an open differential may affect the total amount of weight that the bogie can support.

Preferably, the open differential of each rail wheel arrangement does not comprise a limited slip differential or a locking differential. Use of a limited slip differential or a locking differential can increase the chance that the rail-based vehicle will derail. By excluding these options from the bogie, this risk of derailment can be reduced.

Optionally, each rail wheel arrangement further comprises a wheel framework, comprising one or more lateral beams connected between the first and second rail wheel. This embodiment will improve the structural integrity of the bogie. For instance, the lateral beams can provide additional structural support to account for the reduction in structural support that results from not using a fixed axle.

In some examples, each rail wheel arrangement comprises a different motor configured to drive the first and second rail wheel, of the rail wheel arrangement, using the open differential. This approach facilitates improved control over the torque applied to each wheel arrangement, e.g. to allow different amounts of torque to be applied at different points around a corner or up/down an incline. This approach can improve the efficiency of the rail-based vehicle.

Each rail wheel arrangement may comprise a gearbox connected between the motor of the rail wheel arrangement and the open differential of the rail wheel arrangement. Use of a gearbox can allow tailoring or customizing of the wheel speed of the rail wheel arrangement to suit the electrical motor selected. In other words, a gearbox can be used to allow the electrical motor to operate at the most efficient RPM (e.g. most energy efficient), whilst providing a different RPM for the open differential.

In some embodiments, the motor, of each rail wheel arrangement, is mounted together with the open differential of the rail wheel arrangement. In particular, each rail wheel arrangement may comprise a single mount for coupling both the open differential and the motor, of the rail wheel arrangement, to the remainder of the bogie. For instance, the open differential and the motor may be provided in a same housing—i.e. form a single unit. In particular examples, coupling of the motor and the open differential may be via a resilient drive and via a drive/Cardan shaft.

The motor of each rail wheel arrangement is configured to operate at a rotation speed of up to 8000 rotations per minute. Other suitable rotation speeds will be apparent to the skilled person. In some examples, the motor of each rail wheel arrangement is configured to provide a torque of up to 150 Nm.

Preferably, the motor of each rail wheel arrangement is an electric motor. In some examples, the electric motor of each rail wheel arrangement is configured to receive power from an inverter, wherein motors of different rail wheel arrangements receive power from different inverters.

There is also proposed a rail-based vehicle comprising two or more bogies having an open differential as herein described. In particular, there may be provided a rail-based vehicle comprising: two or more bogies, which each rail wheel arrangement comprises an electric motor; and a battery configured to provide power to the motor of each rail wheel arrangement.

Preferably, the rail-based vehicle further comprises, for rail wheel arrangement, a separate inverter for converting a DC voltage, provided by the battery, to an AC voltage for powering the motor of said rail wheel arrangement.

In some examples, the overall weight of the rail-based vehicle is less than 20,000 kg, e.g. less than 17,000 kg, e.g. less than 12,000 kg (e.g. if excluding passenger weight). Preferably, the overall weight of the rail-based vehicle is no less than 10,000 kg (e.g. excluding passengers). Thus, the weight may range from 10,000 kg to 20,000 kg, from 10,000 kg to 17,000 kg, from 10,000 kg to 12,000 kg.

Returning to FIG. 1, the various components of the bogie 100 may be mounted on a bogie frame 150, sometimes called a chassis or framework. The bogie frame 150 is also configured or arranged to be fastenable to a carriage, train or tram (not shown), i.e. the rest of the rail-based vehicle.

The bogie frame 150 may connect to the carriage via a bolster 153 and a fastening mechanism 155. The fastening mechanism 155 may be configured to rotate with respect to a connected carriage, e.g. the fastening mechanism may allow the bogie 100 to rotate about some predetermined axis. Thus, the fastening mechanism 155 may comprise a fulcrum or pivot pin (sometimes called a center pin). However, the use of a rotatable fastening system is not essential, and the bogie may instead be fixedly secured to the remainder of the rail-based vehicle.

If present, the first framework 118 described above may form part of this bogie frame 150.

In some examples, the fastening arrangement 155 is configured to allow the passage of cables, e.g. control cables or cables carrying the direct current, to the components of the bogie.

In some such examples, the inverter may be positioned proximate or adjacent to the fastening arrangement, in order to reduce or minimize the amount of cabling required (and thereby reduce potential electromagnetic interference caused by lengthy cables as well as improving efficiency by reducing potential loss of energy, e.g. due to impedances in the cables and the like).

Just as the fastening arrangement 155 may be positioned towards a center of the bogie (e.g. to facilitate improved ease of following the curvature of the track and to maximize a support provided by the bogie), so the inverter arrangement 140 may be positioned towards a center of the bogie.

In particular, if a horizontal plane of the bogie is conceptually divided into a 3×3 grid, the center of the inverter arrangement may be positioned in the central column and central row of the 3×3 grid. The horizontal plane is a plane which, when the bogie is placed on flat ground, is parallel to the flat ground.

Other suitable components of a bogie will be readily apparent to the skilled person, and may include (amongst others) a suspension arrangement, a braking arrangement). A full description of such components is omitted for the sake of conciseness, and to emphasize the inventive concept of the present invention.

Figure 5:
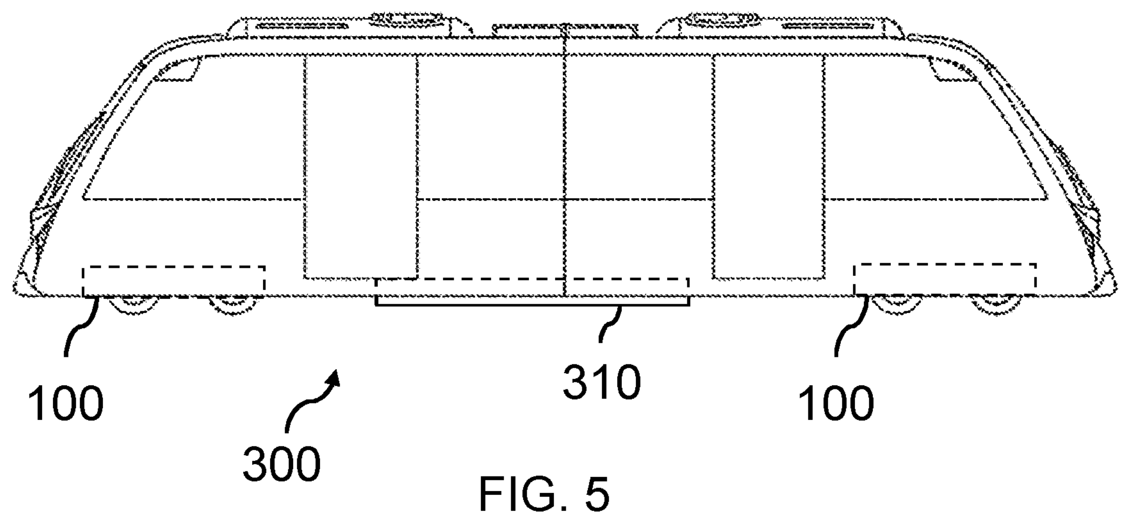
FIG. 5 illustrates a rail-based vehicle according to an embodiment.

FIG. 5 illustrates a rail-based vehicle 300 according to an embodiment. The rail based vehicle comprises a plurality of bogies 100, and in the illustrated example, comprises two bogies.

The rail-based vehicle 300 may further comprise a battery arrangement 310. The battery arrangement may be configured to provide (direct current) power to the inverter arrangement (of each of the bogies 100). The battery arrangement 310 may be configured to connect to the inverter arrangement over one or more power cables (not shown), which may be designed for carrying high voltages. These voltages may be in the region of 500V to 800V, e.g. up to no more than 750V, e.g. up to around 710V.

In embodiments in which the first and second rail wheels of each rail wheel arrangement are connected together by an open differential, the overall weight of the rail-based vehicle may preferably be less than 20,000 kg, e.g. less than 17,000 kg, e.g. less than 12,000 kg (e.g. if excluding passenger weight). The overall weight of the rail-based vehicle may be no less than 10,000 kg (e.g. excluding passengers). Thus, the weight may range from 10,000 kg to 20,000 kg, from 10,000 kg to 17,000 kg, from 10,000 kg to 12,000 kg. Thus, the bogies 100 may be designed for supporting a rail-based vehicle having a weight of no more than 20,000 kg, e.g. less than 17,000 kg, e.g. less than 12,000 kg (e.g. if excluding passenger weight).

The inventors have recognized that an open differential (particularly those designed for an automotive vehicle such as a car) can be used in circumstances where the weight of the rail-based vehicle is relatively low, for example, in urban environments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A bogie for a rail-based vehicle, the bogie comprising:

one or more rail wheel arrangements, each rail wheel arrangement comprising a first rail wheel and a second, different rail wheel;

a motor arrangement comprising one or more electrical motors configured to drive the rail wheels of each rail wheel arrangement;

an inverter arrangement configured to:

receive a direct current from a battery arrangement;

convert the direct current into one or more alternating currents; and provide the one or more alternating currents to the one or more electrical motors of the motor arrangement to power the one or more electrical motors; and a cooling system comprising water configured to cool the motor arrangement and the inverter arrangement, wherein the cooling system is confined to the bogie.

2. The bogie of claim 1, wherein the inverter arrangement comprises, for each electrical motor of the motor arrangement, a respective inverter configured to receive the direct current from the battery arrangement and convert the direct current into an alternating current for the electrical motor.

3. The bogie of claim 1, wherein the motor arrangement comprises, for each rail wheel arrangement, a respective electrical motor configured to drive the rail wheels of the rail wheel arrangement.

4. The bogie of claim 1, wherein the one or more wheel arrangements comprises two or more rail wheel arrangements.

5. The bogie of claim 1, wherein the inverter arrangement comprise a cooling system inverter configured to receive the direct current from the battery arrangement and convert the direct current into an alternating current for the cooling system, the cooling system inverter being configured for use with the cooling system alone.

6. The bogie of claim 1, wherein the inverter arrangement further comprises an inverter controller, configured to control the properties of the one or more alternating currents provided to the one or more electrical motors of the motor arrangement.

7. The bogie of claim 1, wherein the inverter arrangement is configured to receive the direct current from a battery arrangement positioned externally to the bogie.

8. The bogie of claim 1, wherein the inverter arrangement is positioned towards the center of the bogie.

9. A rail-based vehicle comprising two or more bogies according to claim 1.

10. The rail-based vehicle of claim 9, further comprising a battery arrangement configured to provide a direct current to the inverter arrangement of each bogie.

11. The rail-based vehicle of claim 10, wherein the battery arrangement is separate to the two or more bogies.

12. The rail-based vehicle of claim 8, wherein the rail-based vehicle is devoid of a system for drawing power from an external power source during travel of the rail-based vehicle.

13. The rail-based vehicle of claim 8, wherein the overall weight of the rail-based vehicle is less than 20,000 kg.

* * * * *